(12) United States Patent
Haggard, Sr. et al.

(10) Patent No.: US 10,143,944 B2
(45) Date of Patent: Dec. 4, 2018

(54) FILTER UNDERDRAIN WITH INTERNAL AIR SCOUR LATERALS

(71) Applicant: Ovivo Inc., Montreal (CA)

(72) Inventors: Gary D. Haggard, Sr., Lakeway, TX (US); Brendan Kelly, Austin, TX (US)

(73) Assignee: Ovivo Inc., Montreal (CA)

( * ) Notice: Subject to any disclaimer, the term of this patent is extended or adjusted under 35 U.S.C. 154(b) by 150 days.

(21) Appl. No.: 15/146,770

(22) Filed: May 4, 2016

(65) Prior Publication Data
US 2017/0319989 A1    Nov. 9, 2017

(51) Int. Cl.
*B01D 24/46* (2006.01)
*B01D 24/22* (2006.01)
*B01D 24/24* (2006.01)

(52) U.S. Cl.
CPC ......... *B01D 24/4631* (2013.01); *B01D 24/22* (2013.01); *B01D 24/24* (2013.01)

(58) Field of Classification Search
CPC .... B01D 24/42; B01D 24/4631; B01D 24/24; B01D 24/22; B01D 24/12; B01D 24/14
See application file for complete search history.

(56) References Cited

U.S. PATENT DOCUMENTS

| | | | |
|---|---|---|---|
| 2,710,692 A | 6/1955 | Kegel et al. | |
| 4,065,391 A | 12/1977 | Farabaugh | |
| 4,214,992 A | 7/1980 | Sasano et al. | |
| 4,322,299 A | 3/1982 | Scholten et al. | |
| 5,019,259 A | 5/1991 | Hambley | |
| 5,269,920 A | 12/1993 | Brown et al. | |
| 5,328,608 A | 7/1994 | Bergmann et al. | |
| 5,639,384 A | 6/1997 | Brown et al. | |
| 6,077,435 A * | 6/2000 | Beck | B01D 37/046 210/108 |
| 6,090,284 A | 7/2000 | Melber et al. | |
| 6,325,931 B1 | 12/2001 | Roberts et al. | |
| 6,569,328 B1 | 5/2003 | Haggard | |
| 6,691,413 B2 | 2/2004 | Haggard | |
| 6,797,166 B1 | 9/2004 | Hambley et al. | |
| 2002/0096463 A1 | 7/2002 | Roberts et al. | |
| 2004/0007541 A1 | 1/2004 | Stegge | |
| 2008/0245750 A1 | 10/2008 | Geibel | |
| 2011/0036767 A1* | 2/2011 | Kuo | B01D 63/00 210/321.69 |
| 2013/0277319 A1* | 10/2013 | Theodoulou | C02F 11/125 210/770 |
| 2014/0021121 A1 | 1/2014 | Ball et al. | |
| 2014/0097143 A1* | 4/2014 | Clements | B01D 35/12 210/741 |
| 2014/0356066 A1* | 12/2014 | Meurer | B01D 24/24 405/43 |

* cited by examiner

*Primary Examiner* — David C Mellon
*Assistant Examiner* — Liam Royce
(74) *Attorney, Agent, or Firm* — Thomas M. Freiburger

(57) ABSTRACT

Underdrain units in a sand medium or dual medium filtration system include efficient air, water and combined air/water cleaning. Air, water or both are delivered in backflow direction from a very low position on the underdrain unit, as well as water from a higher position, so as to effectively remove blocking contaminants on the outside the underdrain unit and in the surrounding filter media.

4 Claims, 3 Drawing Sheets

STEP ONE
(AIR ONLY)

STEP TWO
(AIR & WATER)

STEP ONE
(AIR ONLY)

STEP TWO
(AIR & WATER)

STEP THREE
(WATER ONLY)

FILTER UNDERDRAIN WITH INTERNAL AIR SCOUR LATERALS

BACKGROUND OF THE INVENTION

This invention concerns underdrain filtration systems, especially sand filters wherein metal underdrain units extend longitudinally at the bottom of the medium. More specifically it is concerned with backflushing of the underdrain units and surrounding medium to remove particulates or cake on the outside of the underdrain unit and in the surrounding filter medium.

Current stainless steel underdrain products are essentially limited to one of two configurations: (1) an air scour lateral is internal but positioned at the top of the underdrain compartment; or (2) the air laterals are "outside", separate from the underdrain unit, either a pipe or rectangular tube (such as shown in U.S. Pat. No. 6,090,284). Fine openings that make the underdrain unit "media retaining" are typically formed in separate panel pieces bolted or welded to the outside of the underdrain body, although in some underdrain systems the small openings were slits formed in the folded metal underdrain structure itself. There are currently three products fitting the above description. Two current stainless steel underdrain products can have the air feed from the gullet, from below the underdrain; one cannot. Two of the current stainless steel products do not scour the bottom four inches of filter media in the filter with air. The air scour chamber and ports are located too high in the product to allow full depth scouring.

The following U.S. patents and publications have some relevance to the invention: U.S. Pat. Nos. 2,710,692, 4,065,391, 4,214,992, 4,322,299, 5,019,259, 5,269,920, 5,328,608, 5,639,384, 6,090,084, 6,325,931, 6,569,328, 6,691,413, 6,797,166, 2002/0096463, 2004/007541, 2008/0245750 and 2014/0021121.

Prior underdrain units have not exhibited the efficiency and overall effectiveness in cleaning the exterior underdrain units and surrounding filter medium as in the current invention.

SUMMARY OF THE INVENTION

The invention described herein distributes backflow air and water, separately and/or together, in such a way as to clear all perforations of a metal underdrain unit of particulate matter gathered during filtration, and to clean the filter medium outside the units, carrying the particles away.

One important feature of the new underdrain unit design is improved air/water cleaning at the lowest level of the filter, as compared to other current designs of underdrain units. Air for scouring enters the filter medium at the bottom of the underdrain unit, preferably through air inlet orifices in the floor. Air and water enter the medium together as simultaneous air/water cleaning through air and water orifices, again up through the floor of the unit. A final stage preferably is a water only cleaning stage that completes the removal of particles.

Another important benefit of the current underdrain configuration is that it allows floor air inlet orifices to be used for water orifices when not used for air. In conventional underdrain systems air and water compartments were completely separate, with the inlet orifice being exclusive for only air or only water.

The invention also encompasses a preferred method of operation for cleaning the filtration units and surrounding medium in the system as described above.

First is an air only step, agitating the medium banging the medium grains together to accomplish a scrubbing action detaching the trapped particles from the grains of medium. This makes it easier to flush the detached particles from the medium and to accomplish this using less water.

Second is a combination air and water step, continuing to agitate the medium but also introducing water at a low "sub-fluidization" rate. The water rate is too low to suspend grains of medium by using the velocity of the water moving through it but it is high enough to begin moving the detached particles from the filter medium. The water continues to carry the medium out of the filter bed.

Third is the water-only step; air scour is terminated. Water flow is gradually increased to a high "fluidization" rate expanding the medium bed and flushing all the detached particles from the bed. This step is accomplished using less water than other systems of the prior art.

With the system and method of the invention, there are no "dead zones" of air or water for cleaning the filter medium bed, unlike previous and conventional designs.

It is among the objects of the invention to more efficiently and thoroughly clean particulate material from an underdrain filtration system during backflow cleaning cycles as compared to prior systems, with savings in water and energy costs. These and other objects, advantages and features of the invention will be apparent from the following description of a preferred embodiment, considered along with the accompanying drawings.

DESCRIPTION OF PREFERRED EMBODIMENTS

Figure 1:
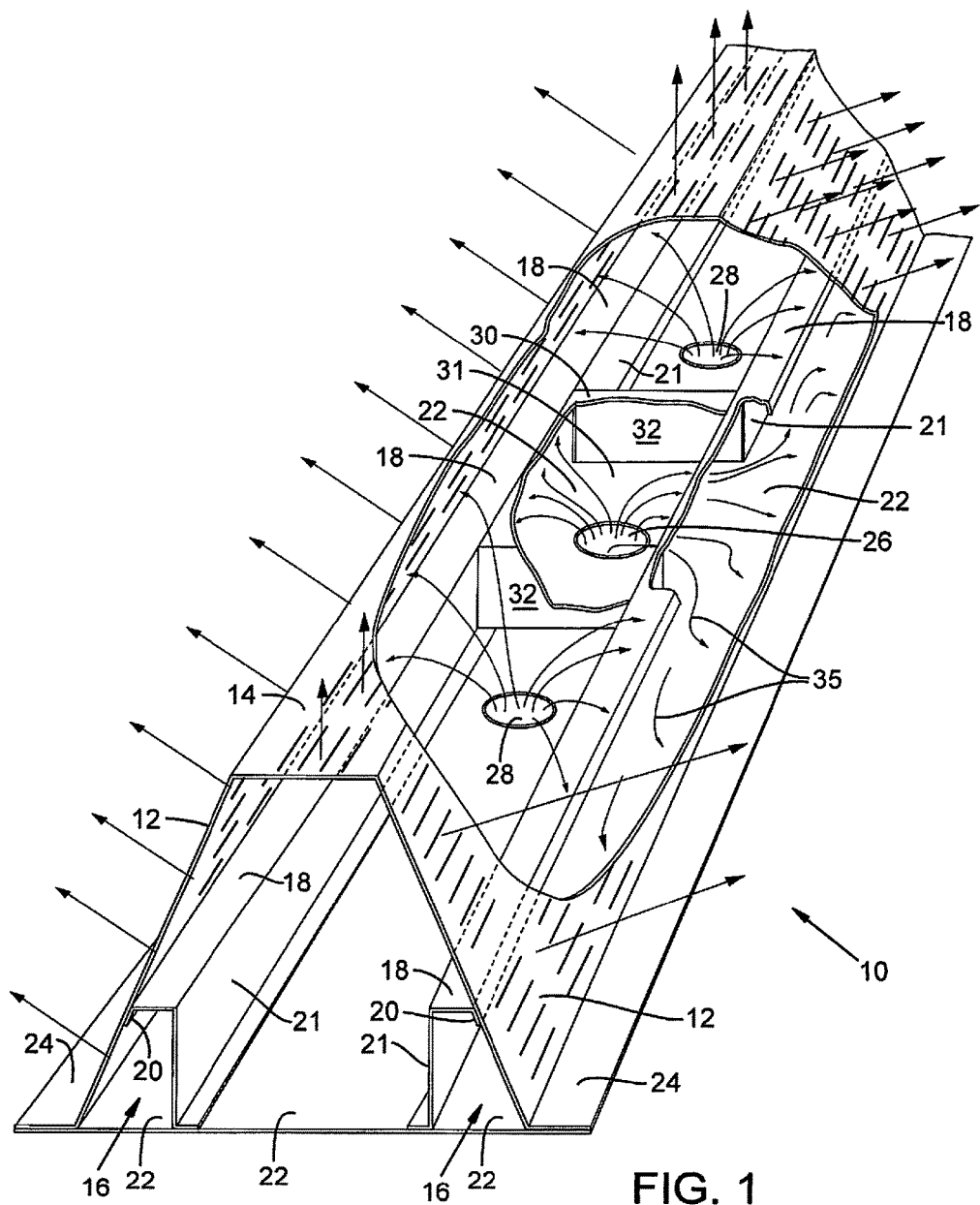
FIG. 1 is a perspective view, partially cut away, showing an underdrain filtration unit according to the invention.

FIG. 1 shows in perspective, and somewhat schematically, a portion of an underdrain unit 10 for an underdrain filtration system. As is typical, a granular filter medium, typically sand (sometimes gravel is placed below the sand), surrounds a series of underdrain units 10 arranged in parallel in a basin floor. The illustrated underdrain unit 10 is a folded sheet metal unit typically formed of stainless steel and having a multiplicity of perforations (indicated as slits as an example) at least in its two sides 12, and they can also be included in the top surface 14. What is illustrated here is a trapezoidal folded underdrain unit, which is preferred, although the unit could be rectangular if desired. These folded metal underdrain units are shaped essentially as shown in prior U.S. Pat. Nos. 6,090,284, 6,569,328, 6,691,413 and 6,797,166. The perforations for passing filtrate into the interior of the unit, and for holding back filter medium, can be formed in accordance with U.S. Pat. Nos. 6,569,328 and 6,691,413, both owned by the applicant corporation.

As described above, the underdrain filtration unit 10 is formed with side ducts 16 inside the interior of the trapezoidal filtration unit. These are air and water distribution ducts for cleaning the filter medium. The ducts 16 are secured to the walls of the underdrain plenum by welding, rivets or other suitable efficient securing means, with a top horizontal part 18 of the duct structure preferably having a lip 20 that extends down at a slightly oblique angle to match the angle of the side walls 12 of the structure. A vertical wall 21 extends down from the horizontal plate 18 as shown, with the parts 18, 20 and 21 all being an integral folded metal component. Each unit 10 preferably has a floor 22, and can be adequately and reliably secured to the floor. As illustrated, the unit includes "foot" flanges 24 at each side, for securing to the basin floor. Typically the unit will be secured to the floor in sealed relationship.

As shown in FIG. 1, an air inlet orifice is positioned as shown at 26, from a duct or conduit below the floor. Other inlet orifices are shown at 28. The air inlet 26 enters a space 31 defined by the floor, a top cover plate 30 and two walls 32 positioned at longitudinal ends of this space. The entering air (or water, as seen below), is thus directed in outward directions, left and right with respect to the longitudinally extending unit 10, into the side ducts 16. The air is distributed through the length of the side ducts, so as to distribute the flow of air generally evenly through the perforations or slits in the walls 12 of the unit at the lower portion of those walls.

The other two fluid delivery orifices 28 in the floor are for delivery of water. Water enters these orifices between the side ducts 16, flows upwardly and reaches only the filtrate perforations above the ducts 16.

Figure 2:
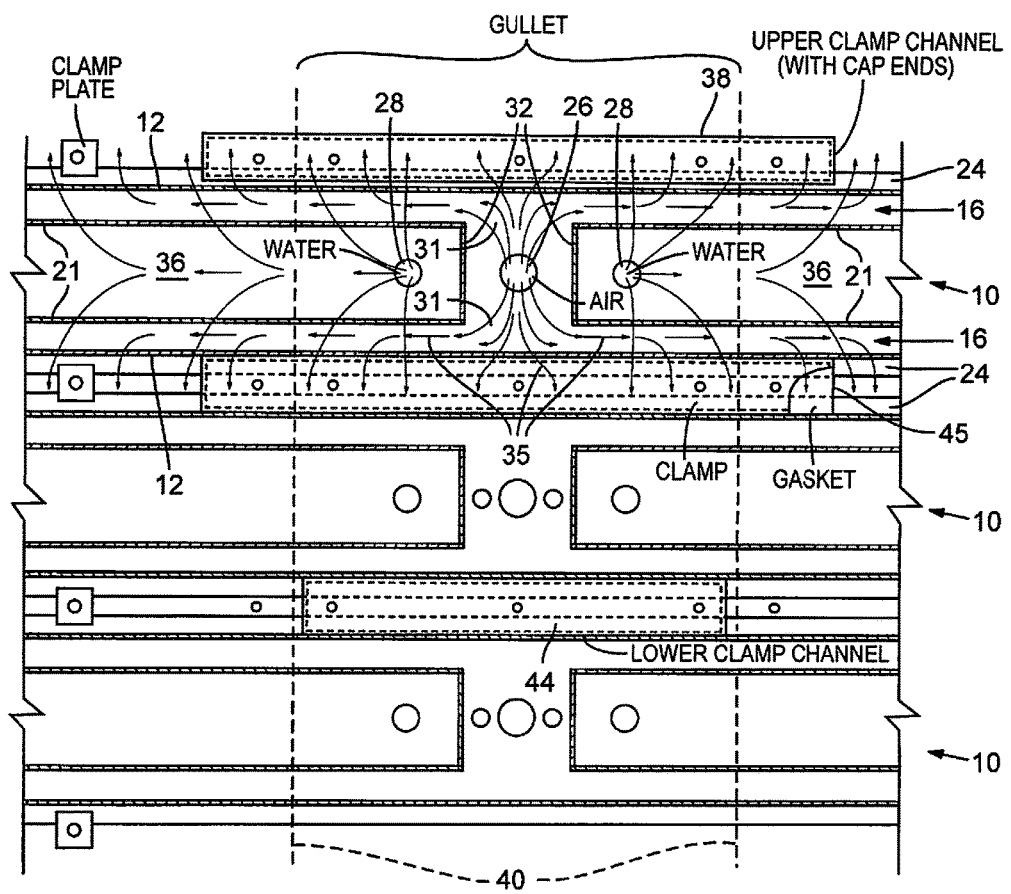
FIG. 2 is a plan view showing an underdrain unit of the invention.

FIG. 2 shows the underdrain filtration unit 10 in plan view. A single unit can be, for example, about 22 feet in length (or a range of about 10-30 feet), and about 11 inches in overall width (or a range of about 8 inches to 14 inches). The width includes the outwardly projecting "feet" or anchoring flanges 24. FIG. 2 does not show the side walls or top of the underdrain unit (which can be about 6 inches in height, or a range of about 5 to 8 inches), but shows the duct walls 21 and the walls 32 that define the air inlet atrium space 31. The drawing indicates air flow patterns from the air inlet manifold or atrium 31 out into the air-distributing side ducts 16, indicated with arrows 35.

In one preferred embodiment, underdrain units 10 having the approximate dimensions mentioned above can have side ducts with approximately two inch width at bottom and about two inches high (height of walls 21), leaving about five inches between the walls 21, defining the width of the air inlet chamber 31 and the water inlet space 36. These dimensions can vary, keeping the approximate proportions as with the dimensions above.

The underdrain units are retained down to the floor in a way similar to that of U.S. Pat. No. 6,090,284, by clamp channels 38 secured to the floor, or another suitable connection. The underdrain units 10 are arrayed side by side as shown in FIG. 2, and they can be secured in tandem end to end (in sealed relationship) if needed for the size of the filter basin in which they are installed. FIG. 2 indicates in dashed lines a gullet 40 extending laterally beneath and transverse to the underdrain units. The gullet transports filtrate water out, and also serves to deliver cleaning water into the plenum and, via a pipe 42 (FIGS. 3-5) laid within the plenum, scour air into the plenum. Where the underdrain units bridge the gullet 40 the clamp channel 38 cannot be bolted to the floor but instead is bolted to a lower clamp channel 44 immediately below the clamp channel 38. For clarity the lower channel 44 is shown at a different location on FIG. 2, with a length to extend the width of the gullet 40. Between adjacent underdrain units 10 the underdrain foot flanges 24 are sandwiched between the upper and lower clamp flanges 38 and 44 with a gasket 45, sealing the two underdrain units at bottom over the gullet.

Figure 3:
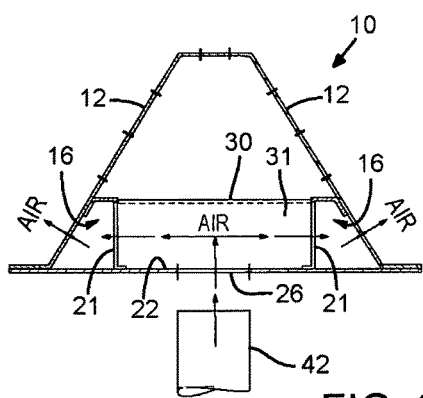
FIGS. 3, 4 and 5 are schematic elevation views in cross section showing three different stages of cleaning in a preferred method of the invention.
Figure 4:
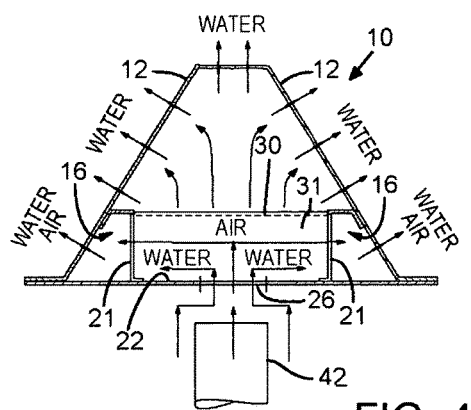
Figure 5:
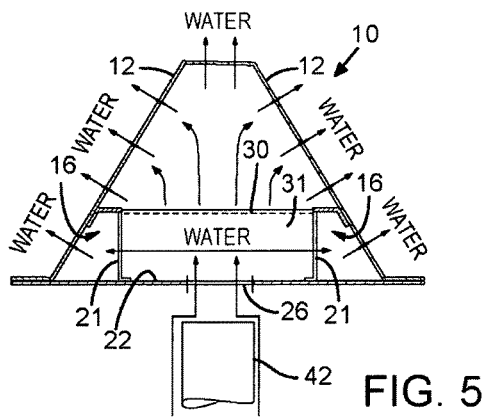

FIGS. 3, 4 and 5 are schematic views in sectional elevation showing an underdrain unit 10 of the invention. The unit 10 in FIG. 3 lies on a concrete floor surface, but the floor is not shown in these schematic views.

As explained and shown above, air coming up through the air opening 26 in the sheet metal floor 22 of the unit is distributed via the entry atrium 31 to the side ducts 16 for distribution of this scour air through lower perforations of the unit, perforations within the area where these ducts 16 are positioned. As described above, this air scour is a first step in cleaning the perforations and surrounding filter medium outside the unit 10. The pressurized air is delivered through a duct or pipe 42 that is laid within the gullet 40 discussed above. The gullet is substantially filled with water. The air under pressure passes through any gullet water above the upper end of the pipe 42 and is distributed up through the ducts 16 to agitate the medium to accomplish a scrubbing action that detaches the trapped particles from the grains of medium. As explained above, once this scrubbing action has occurred, the detached particles can be flushed from the medium using less water than would otherwise be required.

The next stage or step of cleaning, indicated in FIG. 4, involves both air and water being flushed simultaneously up through the perforations of the underdrain unit. Air and water are delivered together, through the central floor inlet orifice 26. Water in the gullet is put under pressure for this step and air is delivered through the conduit or pipe 42 simultaneously, so that air and water are driven out the lower underdrain perforations, from the side ducts 16. At the same time, the pressurized water is admitted through the other floor inlet orifices 28, so that water also is flushed through the remaining underdrain perforations, above the ducts 16 and above the cover plate 30 that defines the top of the inlet atrium 30, 31. As characterized above, this air/water flush step continues to agitate the filter medium while introducing water at a low rate, below a fluidization flow rate. The flow of water is sufficient to move the attached particles from the filter medium, and the water continues to carry the medium out of the filter bed.

In FIG. 5, the third stage of cleaning pursuant to the invention, only water is delivered through all floor inlet orifices 26 and 28. The pipe 42 is not shown but remains in place without any air delivery, i.e. without air scouring. As noted above, the flow of water is gradually increased to a high rate for fluidization of the medium, expanding the medium bed and flushing substantially all the detached particles from the bed. Because of the action of the previous steps, considerably less water is required than in prior underdrain backflow cleaning systems and methods.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A method for cleaning underdrain units and surrounding granular filter medium in an underdrain filtration system that has a series of such longitudinal underdrain units in a parallel array for collection of filtrate passing down through a filter medium or media and through perforations in the walls of the underdrain units, by air and water backflow cleaning to remove filter cake and contaminants surrounding the underdrain units, comprising:

each underdrain unit comprising an elongated metal shell having two sides and a top, and having perforations formed directly in the metal shell with perforations essentially through the height of the sides, including a first plurality of perforations at a lower position at each side and a second plurality of perforations at a higher position on each side above said first plurality of perforations, and the underdrain unit having a bottom at a floor of the underdrain filtration system such that the shell with the bottom define an internal filtrate-collecting plenum, the first plurality of perforations in each side of the underdrain unit including perforations at least as low as two inches above the bottom of the underdrain unit, and the underdrain unit including within the plenum two side ducts, one at each side and at the bottom of the underdrain unit such that a side of the shell, with said first plurality of perforations, forms an outer wall of each side duct, each side duct extending longitudinally through the unit, in a first cleaning step, directing pressurized air into the side ducts of the plenum of the unit to distribute air near the filtration system floor through said first plurality of perforations throughout the length of the underdrain unit to exit the first plurality of perforations and to effect a scrubbing action that detaches trapped particles from grains of filter medium outside the unit;

in a second cleaning step, delivering both air and water simultaneously under pressure, into the side ducts to exit through the first plurality of perforations near the filtration system floor, with the water delivered at a sub-fluidization rate; and in a third cleaning step, delivering water alone under pressure into the side ducts and into the remainder of the plenum so as to flush water through all perforations of the underdrain unit, thereby flushing substantially all detached particles from the filter medium bed.

2. The method of claim 1, wherein, in the second cleaning step, water is also admitted into the remainder of the plenum of the underdrain unit, so that air and water together are delivered out through the first set of perforations, and water alone is flushed out through all remaining perforations of the unit.

3. The method of claim 1, wherein, in the third cleaning step, the flow of water into the underdrain unit is gradually increased to a rate for fluidization of the filter medium, expanding the medium bed and flushing remaining detached particles from the bed.

4. The method of claim 1, wherein the sides of the metal shell of the underdrain unit are sloped so as to be closer together at the top of the unit than at the bottom, defining a trapezoidal shape.

* * * * *